United States Patent
Fainor et al.

(10) Patent No.: US 12,375,495 B2
(45) Date of Patent: Jul. 29, 2025

(54) SYSTEMS, APPARATUSES, METHODS, AND COMPUTER PROGRAM PRODUCTS FOR COMPUTING ACCOUNT OPTIMIZATION

(71) Applicant: HONEYWELL INTERNATIONAL INC., Charlotte, NC (US)

(72) Inventors: Judith Fainor, Doylestown, PA (US); James D. Daviner, Lincoln, CA (US); Ankit Singh, Apex, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 218 days.

(21) Appl. No.: 18/342,448

(22) Filed: Jun. 27, 2023

(65) Prior Publication Data

US 2025/0007917 A1    Jan. 2, 2025

(51) Int. Cl.
    *H04L 9/40*    (2022.01)

(52) U.S. Cl.
    CPC ........ *H04L 63/102* (2013.01); *H04L 63/0823* (2013.01)

(58) Field of Classification Search
    None
    See application file for complete search history.

(56) References Cited

U.S. PATENT DOCUMENTS

| | | | |
|---|---|---|---|
| 2007/0289024 A1* | 12/2007 | Mohammed | H04L 63/101 726/28 |
| 2016/0019401 A1* | 1/2016 | Kumar | G06F 21/6272 726/30 |
| 2020/0204558 A1* | 6/2020 | Kurmi | H04L 63/101 |
| 2023/0186160 A1* | 6/2023 | Holboke | G06F 18/214 726/27 |
| 2023/0336560 A1* | 10/2023 | Kulai | G06F 21/604 |

OTHER PUBLICATIONS

Salesforce, "Understand Event-Driven Software Architecture," 1-5, (Mar. 22, 2022). [Retrieved from the Internet Jan. 17, 2024: URL: <https://web.archive.org/web/20220322034551/https://trailhead.salesforce.com/en/content/learn/modules/platform_events_basics/platform_events_architecture>].

* cited by examiner

*Primary Examiner* — Atta Khan
(74) *Attorney, Agent, or Firm* — ALSTON & BIRD LLP

(57) ABSTRACT

Systems, apparatuses, methods, and computer program products are provided. For example, a method provided herein may include identifying operational data representative of an activity amount associated with a computing account. In some embodiments, the method may include determining that the computing account is associated with a deactivated status based at least in part on the operational data. In some embodiments, the method may include parsing a computing account dataset associated with the computing account to identify a plurality of computing account objects. In some embodiments, the method may include applying the plurality of computing account objects to a computing account objects classification model. In some embodiments, the method may include generating a plurality of computing account representation requests. In some embodiments, the method may include transmitting each of the plurality of computing account representation requests to a corresponding computing application of the plurality of computing applications.

20 Claims, 5 Drawing Sheets

SYSTEMS, APPARATUSES, METHODS, AND COMPUTER PROGRAM PRODUCTS FOR COMPUTING ACCOUNT OPTIMIZATION

TECHNOLOGICAL FIELD

Embodiments of the present disclosure relate generally to systems, apparatuses, methods, and computer program products for computing account optimization.

BACKGROUND

Applicant has identified many technical challenges and difficulties associated with systems, apparatuses, methods, and computer program products for computing account optimization. Through applied effort, ingenuity, and innovation, Applicant has solved problems related to systems, apparatuses, methods, and computer program products for computing account optimization by developing solutions embodied in the present disclosure, which are described in detail below.

BRIEF SUMMARY

Various embodiments described herein relate to systems, apparatuses, methods, and computer program products computing account optimization.

In accordance with one aspect of the disclosure, a computer-implemented method is provided. In some embodiments, the computer implemented method may include identifying operational data representative of an activity amount associated with a computing account. In some embodiments, the computer implemented method may include determining that the computing account is associated with a deactivated status based at least in part on the operational data. In some embodiments, the computer implemented method may include parsing a computing account dataset associated with the computing account to identify a plurality of computing account objects. In some embodiments, the computer implemented method may include applying the plurality of computing account objects to a computing account objects classification model. In some embodiments, the computing account objects classification model is configured to classify a particular computing account object into a particular classification of a plurality of classifications. In some embodiments, the particular classification of the plurality of classifications indicates a particular computing application of a plurality of computing applications associated with the particular computing account object. In some embodiments, the computer implemented method may include generating a plurality of computing account representation requests. In some embodiments, a particular computing account representation request of the plurality of computing account representation requests is associated with the particular computing application corresponding to the particular classification of the plurality of classifications. In some embodiments, the computer implemented method may include transmitting each of the plurality of computing account representation requests to a corresponding computing application of the plurality of computing applications. In some embodiments, the particular computing account representation request is transmitted to the particular computing application corresponding to the particular computing account representation request.

In some embodiments, the plurality of computing applications includes one or more of an account management computing application, a cloud based computing application, or a sandbox environment computing application.

In some embodiments, each of the plurality of computing account representation requests include one or more deactivation triggers or one or more activation triggers.

In some embodiments, at least one of the one or more deactivation triggers causes the computing account to be disassociated with at least one of the plurality of computing account objects.

In some embodiments, at least one of the one or more activation triggers causes one or more other computing accounts to be associated with at least one of the plurality of computing account objects.

In some embodiments, at least one of the one or more activation triggers causes a plurality of other computing accounts to be associated with at least one of the plurality of computing account objects.

In some embodiments, at least one of the one or more activation triggers causes first metadata associated with at least one of the plurality of computing account objects to be replaced with second metadata.

In some embodiments, at least one of the one or more deactivation triggers reduces a computing resource consumption associated with the computing account.

In some embodiments, at least one of the of the one or more deactivation triggers is revokes a security certificate associated with the computing account and at least one of the one or more activation triggers provides the security certification to one or more other computing accounts.

In some embodiments, determining that the computing account is associated with a deactivated status based at least in part on the operational data comprises applying the operational data to an activity amount determination model to determine that the activity amount associated with a computing account is below an activity threshold.

In accordance with another aspect of the disclosure, an apparatus is provided. In some embodiments, the apparatus may include at least one processor and at least one memory coupled to the at least one processor. In some embodiments, the at least one processor is configured to identify operational data representative of an activity amount associated with a computing account. In some embodiments, the at least one processor is configured to determine that the computing account is associated with a deactivated status based at least in part on the operational data. In some embodiments, the at least one processor is configured to parse a computing account dataset associated with the computing account to identify a plurality of computing account objects. In some embodiments, the at least one processor is configured to apply the plurality of computing account objects to a computing account objects classification model. In some embodiments, the computing account objects classification model is configured to classify a particular computing account object into a particular classification of a plurality of classifications. In some embodiments, the particular classification of the plurality of classifications indicates a particular computing application of a plurality of computing applications associated with the particular computing account object. In some embodiments, the at least one processor is configured to generate a plurality of computing account representation requests. In some embodiments, a particular computing account representation request of the plurality of computing account representation requests is associated with the particular computing application corresponding to the particular classification of the plurality of classifications. In some embodiments, the at least one processor is configured to transmit each of the plurality of computing account representation requests to a corresponding computing application of the plurality of computing applications. In some embodiments, the particular computing account representation request is transmitted to the particular computing application corresponding to the particular computing account representation request.

In some embodiments, the plurality of computing applications includes one or more of an account management computing application, a cloud based computing application, or a sandbox environment computing application.

In some embodiments, each of the plurality of computing account representation requests include one or more deactivation triggers or one or more activation triggers.

In some embodiments, at least one of the one or more deactivation triggers causes the computing account to be disassociated with at least one of the plurality of computing account objects.

In some embodiments, at least one of the one or more activation triggers causes one or more other computing accounts to be associated with at least one of the plurality of computing account objects.

In some embodiments, at least one of the one or more activation triggers causes a plurality of other computing accounts to be associated with at least one of the plurality of computing account objects.

In some embodiments, at least one of the one or more activation triggers causes first metadata associated with at least one of the plurality of computing account objects to be replaced with second metadata.

In some embodiments, at least one of the one or more deactivation triggers reduces a computing resource consumption associated with the computing account.

In some embodiments, at least one of the of the one or more deactivation triggers is revokes a security certificate associated with the computing account and at least one of the one or more activation triggers provides the security certification to one or more other computing accounts.

In some embodiments, determining that the computing account is associated with a deactivated status based at least in part on the operational data comprises the apparatus being configured to apply the operational data to an activity amount determination model to determine that the activity amount associated with a computing account is below an activity threshold.

In accordance with another aspect of the disclosure, a non-transitory computer-readable storage medium is provided. In some embodiments, the non-transitory computer-readable storage medium may include computer program code for execution by one or more processors of a device. In some embodiments, the computer program code is configured to, when executed by the one or more processors, cause the device to identify operational data representative of an activity amount associated with a computing account. In some embodiments, the computer program code is configured to, when executed by the one or more processors, cause the device to determine that the computing account is associated with a deactivated status based at least in part on the operational data. In some embodiments, the computer program code is configured to, when executed by the one or more processors, cause the device to parse a computing account dataset associated with the computing account to identify a plurality of computing account objects. In some embodiments, the computer program code is configured to, when executed by the one or more processors, cause the device to apply the plurality of computing account objects to a computing account objects classification model. In some embodiments, the computing account objects classification model is configured to classify a particular computing account object into a particular classification of a plurality of classifications. In some embodiments, the particular classification of the plurality of classifications indicates a particular computing application of a plurality of computing applications associated with the particular computing account object. In some embodiments, the computer program code is configured to, when executed by the one or more processors, cause the device to generate a plurality of computing account representation requests. In some embodiments, a particular computing account representation request of the plurality of computing account representation requests is associated with the particular computing application corresponding to the particular classification of the plurality of classifications. In some embodiments, the computer program code is configured to, when executed by the one or more processors, cause the device to transmit each of the plurality of computing account representation requests to a corresponding computing application of the plurality of computing applications. In some embodiments, the particular computing account representation request is transmitted to the particular computing application corresponding to the particular computing account representation request.

In some embodiments, the plurality of computing applications includes one or more of an account management computing application, a cloud based computing application, or a sandbox environment computing application.

In some embodiments, each of the plurality of computing account representation requests include one or more deactivation triggers or one or more activation triggers.

In some embodiments, at least one of the one or more deactivation triggers causes the computing account to be disassociated with at least one of the plurality of computing account objects.

In some embodiments, at least one of the one or more activation triggers causes one or more other computing accounts to be associated with at least one of the plurality of computing account objects.

In some embodiments, at least one of the one or more activation triggers causes a plurality of other computing accounts to be associated with at least one of the plurality of computing account objects.

In some embodiments, at least one of the one or more activation triggers causes first metadata associated with at least one of the plurality of computing account objects to be replaced with second metadata.

In some embodiments, at least one of the one or more deactivation triggers reduces a computing resource consumption associated with the computing account.

In some embodiments, at least one of the of the one or more deactivation triggers is revokes a security certificate associated with the computing account and at least one of the one or more activation triggers provides the security certification to one or more other computing accounts.

In some embodiments, determining that the computing account is associated with a deactivated status based at least in part on the operational data comprises the apparatus being configured to apply the operational data to an activity amount determination model to determine that the activity amount associated with a computing account is below an activity threshold.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
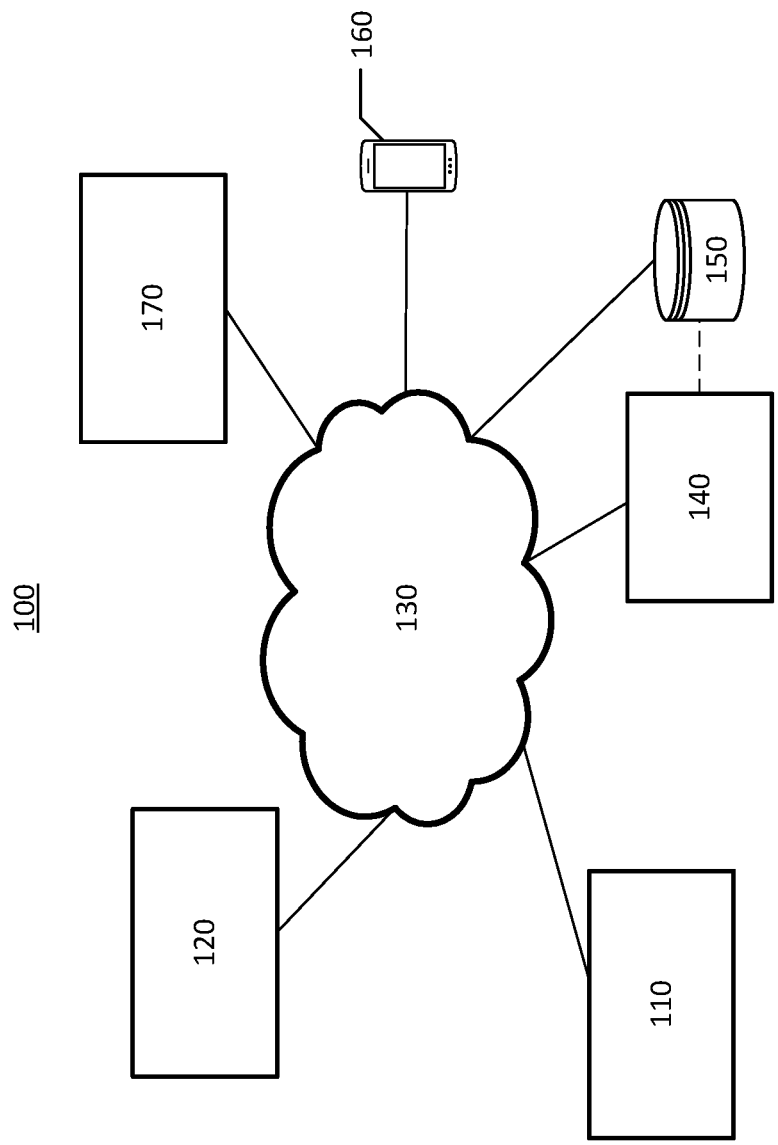
FIG. 1 illustrates an exemplary block diagram of an environment in which embodiments of the present disclosure may operate.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with systems, apparatuses, methods, and computer program products for computing account optimization. As would be understood by one skilled in the field to which this disclosure pertains, there are numerous example scenarios in which systems, apparatuses, methods, and computer program products for computing account optimization are desirable.

In many applications, it may be desirable to perform computing account optimization, such as computing account optimization for computing accounts associated with one or more computing applications. For example, it may be desirable to optimize one or more computing accounts by optimizing computing account objects associated with the one or more computing accounts and/or one or more computing applications. In this regard, for example, it may be desirable to optimize one or more computing accounts by reducing a computing resource consumption associated with a computing resource consumption object associated with the computing account. As another example, it may be desirable to optimize one or more computing accounts by replacing first metadata associated with a document management object associated with a first computing account with second metadata associated with a document management object associated with a second computing account.

Example solutions for optimizing a computing account include generally optimizing a computing account associated with a computing application. However, such an example solution does not contemplate optimizing a computing account associated with one or more computing applications. Additionally, such an example solution does not contemplate optimizing specific computing account objects, such as a computing resource consumption object and/or a document management object.

Thus, to address these and/or other issues related to computing account optimization, example systems, apparatuses, computer program products, and/or methods are disclosed herein. For example, an embodiment described herein includes a computer-implemented method that includes identifying operational data representative of an activity amount associated with a computing account. In some embodiments, the computer-implemented method may include determining that the computing account is associated with a deactivated status based at least in part on the operational data. parsing a computing account dataset associated with the computing account to identify a plurality of computing account objects. In some embodiments, the computer-implemented method may include applying the plurality of computing account objects to a computing account objects classification model. In some embodiments, the computing account objects classification model is configured to classify a particular computing account object into a particular classification of a plurality of classifications. In some embodiments, the particular classification of the plurality of classifications indicates a particular computing application of a plurality of computing applications associated with the particular computing account object. In some embodiments, the computer-implemented method may include generating a plurality of computing account representation requests. In some embodiments, a particular computing account representation request of the plurality of computing account representation requests is associated with the particular computing application corresponding to the particular classification of the plurality of classifications. In some embodiments, the computer-implemented method may include transmitting each of the plurality of computing account representation requests to a corresponding computing application of the plurality of computing applications. In some embodiments, the particular computing account representation request is transmitted to the particular computing application corresponding to the particular computing account representation request. Accordingly, the systems, apparatuses, computer program products, and/or methods disclosed herein enable for optimizing of computing accounts associated with one or more computing applications and/or specific computing account objects.

Example Apparatuses and Systems

Embodiments of the present disclosure herein include systems, apparatuses, methods, and computer program products related to systems, apparatuses, methods, and computer program products for computing account optimization. It should be readily appreciated that the embodiments of the systems, apparatuses, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates a plurality of computing applications. In some embodiments, the plurality of computing applications may include an account management computing application 110. In some embodiments, the account management computing application 110 is configured via hardware, software, firmware, and/or a combination thereof, to perform data intake, data processing, data output, and/or other data process(es) associated with performing one or more computing operations associated with a computing application configured for account management. Although one such account management computing application 110 is illustrated in the environment 100, it would be understood by one skilled in the field to which this disclosure pertains that the environment 100 may include more than one account management computing application 110. For example, the environment 100 may include two or more account management computing applications.

In some embodiments, the plurality of computing applications in the environment 100 may include a cloud based computing application 120. In some embodiments, the cloud based computing application 120 is configured via hardware, software, firmware, and/or a combination thereof, to perform data intake, data processing, data output, and/or other data process(es) associated with performing one or more computing operations associated with a computing application that is cloud based. Although one such cloud based computing application 120 is illustrated in the environment 100, it would be understood by one skilled in the field to which this disclosure pertains that the environment 100 may include more than one cloud based computing application 120. For example, the environment 100 may include two or more cloud based computing applications.

In some embodiments, the plurality of computing applications in the environment 100 may include a sandbox environment computing application 170. In some embodiments, the sandbox environment computing application 170 is configured via hardware, software, firmware, and/or a combination thereof, to perform data intake, data processing, data output, and/or other data process(es) associated with performing one or more computing operations associated with a computing application associated with a sandbox environment. Although one such sandbox environment computing application 170 is illustrated in the environment 100, it would be understood by one skilled in the field to which this disclosure pertains that the environment 100 may include more than one sandbox environment computing application 170. For example, the environment 100 may include two or more sandbox environment computing applications.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include a computing account optimization system 140. The computing account optimization system 140 may be electronically and/or communicatively coupled to the account management computing application 110, cloud based computing application 120, sandbox environment computing application 170, one or more user devices 160, and/or the one or more databases 150. The computing account optimization system 140 may be located remotely, in proximity of, and/or within the account management computing application 110, cloud based computing application 120, and/or sandbox environment computing application 170. In some embodiments, the computing account optimization system 140 is configured via hardware, software, firmware, and/or a combination thereof, to perform data intake of one or more types of data associated with one or more of the account management computing application 110, cloud based computing application 120, and/or sandbox environment computing application 170. Additionally or alternatively, in some embodiments, the computing account optimization system 140 is configured via hardware, software, firmware, and/or a combination thereof, to generate and/or transmit command(s) that control, adjust, or otherwise impact operations of one or more of, the one or more databases 150, account management computing application 110, cloud based computing application 120, and/or sandbox environment computing application 170. Additionally or alternatively still, in some embodiments, the computing account optimization system 140 is configured via hardware, software, firmware, and/or a combination thereof, to perform data reporting and/or other data output process(es) associated with monitoring or otherwise analyzing operations of one or more of the one or more databases 150, account management computing application 110, cloud based computing application 120, and/or sandbox environment computing application 170, for example for generating and/or outputting report(s) corresponding to the operations performed via the account management computing application 110, cloud based computing application 120, and/or sandbox environment computing application 170. For example, in various embodiments, the computing account optimization system 140 may be configured to execute and/or perform one or more operations and/or functions described herein.

The one or more databases 150 may be configured to receive, store, and/or transmit data. In some embodiments, the one or more databases 150 may be associated with one or more datasets associated with the computing account optimization system 140, account management computing application 110, cloud based computing application 120, and/or sandbox environment computing application 170. In some embodiments, the one or more databases 150 may be associated with datasets received and/or generated by the computing account optimization system 140 in real-time. Additionally or alternatively, the one or more databases 150 may be associated with datasets received and/or generated by the computing account optimization system 140 on a periodic basis (e.g., the datasets may be received and/or generated by the computing account optimization system 140 once per day). Additionally or alternatively, the one or more databases 150 may be associated with datasets received by the computing account optimization system 140 after the computing account optimization system 140 has requested the datasets. Additionally or alternatively, the one or more databases 150 may be associated with datasets based on an input (e.g., a user input) into the computing account optimization system 140 and/or the one or more user devices 160.

The one or more user devices 160 may be associated with users of computing account optimization system 140. In various embodiments, the computing account optimization system 140 may generate and/or transmit a message, alert, or indication to a user via one or more user devices 160. Additionally, or alternatively, the one or more user devices 160 may be utilized by a user to remotely access a computing account optimization system 140. This may be by, for example, an application operating on the one or more user devices 160. A user may access the computing account optimization system 140 remotely, including one or more visualizations, reports, and/or real-time displays.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the computing account optimization system 140 may include one or more databases 150, which may collectively be located in or at account management computing application 110, cloud based computing application 120, and/or sandbox environment computing application 170 (e.g., the computing account optimization system 140, account management computing application 110, cloud based computing application 120, and/or sandbox environment computing application 170 may be combined into one or more components).

Figure 2:
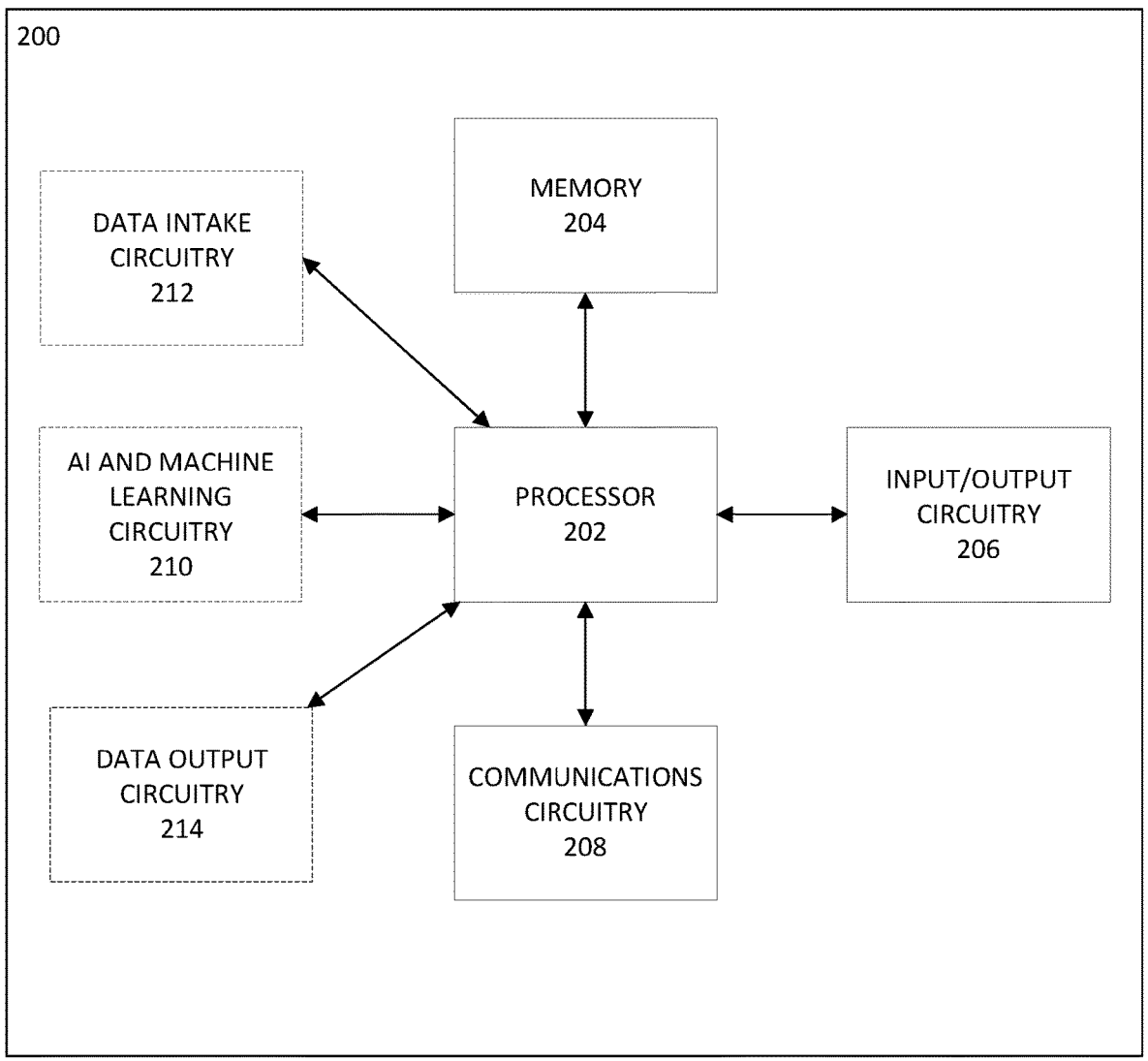
FIG. 2 illustrates an exemplary block diagram of an example apparatus that may be specially configured in accordance with one or more embodiments of the present disclosure.
Figure 3:
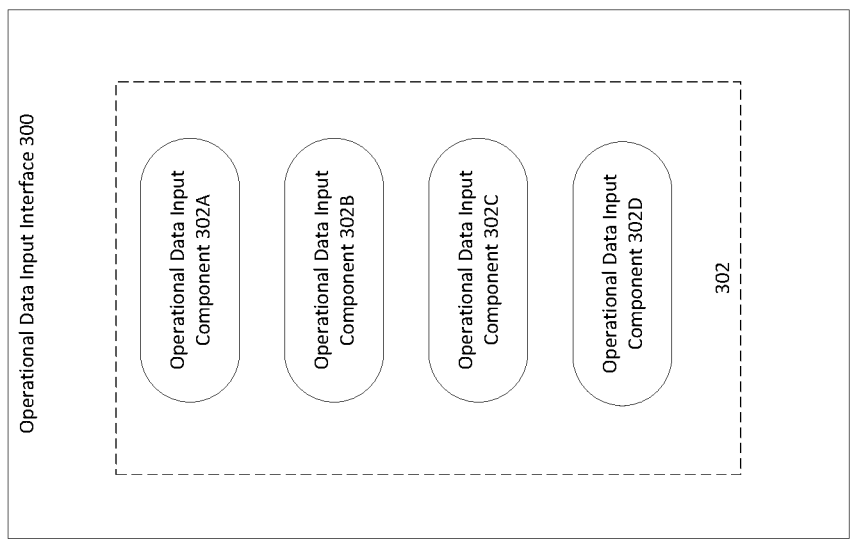
FIG. 3 illustrates an example operational data input interface in accordance with one or more embodiments of the present disclosure.
Figure 4:
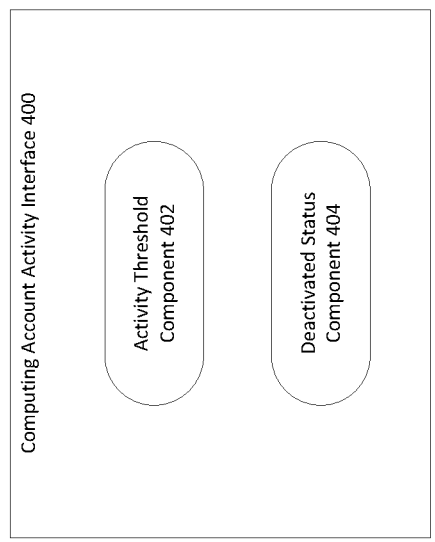
FIG. 4 illustrates an example computing account activity interface in accordance with one or more embodiments of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud based computing apparatus, and/or the like. Examples of an apparatus 200 may include, but is not limited to, the computing account optimization system 140, account management computing application 110, cloud based computing application 120, sandbox environment computing application 170, the one or more user devices 160, and/or the one or more databases 150. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory (ies), circuitry (ies), and/or the like to perform their associated functions such that duplicate hardware is not required for each set of circuitry.

In various embodiments, such as computing apparatus 200 of a computing account optimization system 140, account management computing application 110, cloud based computing application 120, sandbox environment computing application 170, and/or the one or more user devices 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality.

The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data. In some embodiments, the data intake circuitry 212 includes hardware, software, firmware, and/or a combination thereof, that communicates with one or more components of the account management computing application 110, cloud based computing application 120, sandbox environment computing application 170, the one or more user devices 160, and/or the one or more databases 150 to receive particular data. Additionally or alternatively, in some embodiments, the data intake circuitry 212 includes hardware, software, firmware, and/or a combination thereof, that retrieves particular data associated with the account management computing application 110, cloud based computing application 120, sandbox environment computing application 170, the one or more user devices 160, and/or the one or more databases 150 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, datasets, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data (e.g., a natural language processing machine learning model). Additionally or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

With reference to FIGS. 1-4, the computing account optimization system 140 may be configured to identify operational data. In some embodiments, the operational data may be representative of an activity amount associated with a computing account. In some embodiments, a computing account may be configured to interact with one or more computing applications. Said differently a computing account may be configured to cause a computing application to perform data intake, data processing, data output, and/or other data process(es) associated with performing one or more computing operations. For example, a computing account may be configured to cause the account management computing application 110, the cloud based computing application 120, and/or the sandbox environment computing application 170 to perform data intake, data processing, data output, and/or other data process(es) associated with performing one or more computing operations.

In some embodiments, the operational data may be representative of an activity amount associated with a computing account by indicating a number of times that a computing account interacts with a computing application over a time period. Said differently, the operational data may indicate the number of times a computing account causes a computing application to perform data intake, data processing, data output, and/or other data process(es) associated with performing one or more computing operations in a time period. For example, the operational data may indicate that a computing account has interacted with the account management computing application 110 ten times in the last seven day period.

In some embodiments, the operational data may be representative of an activity amount associated with a computing account by indicating an amount of time it has been since a computing account interacted with a computing application. Said differently, the operational data may indicate the amount of time it has been since a computing account caused a computing application to perform data intake, data processing, data output, and/or other data process(es) associated with performing one or more computing operations. For example, the operational data may indicate that it has been sixty days since a computing account has interacted with the cloud based computing application 120.

In some embodiments, the operational data may be representative of an activity amount associated with a computing account by indicating an amount of time that a computing account has interacted with a computing application over a time period. Said differently, the operational data may indicate the amount of time that a computing account has caused a computing application to perform data intake, data processing, data output, and/or other data process(es) associated with performing one or more computing operations over time period. For example, the operational data may indicate that a computing account has interacted with the sandbox environment computing application 170 for ten hours over the last seven day period.

In some embodiments, the operational data may be representative of an activity amount associated with a computing account by indicating whether a computing account is adhering to a service level protocol. Said differently, the operational data may indicate whether a computing account is causing a computing application to perform data intake, data processing, data output, and/or other data process(es) associated with performing one or more computing operations in accordance with a service level protocol. For example, the operational data may indicate that a computing account is not adhering to a service level protocol.

In some embodiments, the operational data may be representative of an activity amount associated with a computing account by indicating whether a computing account has permission to interact with a computing application. Said differently, the operational data may indicate whether a computing account has permission to cause a computing application to perform data intake, data processing, data output, and/or other data process(es) associated with performing one or more computing operations. For example, the operational data may indicate that a computing account does not have permission to interact with the account management computing application 110.

In some embodiments, the operational data identified by the computing account optimization system 140 may be received by the computing account optimization system 140 via an operational data input interface 300. In this regard, the operational data input interface 300 may include a plurality of operational data input components 302. In some embodiments, at least some of the plurality operational data input components 302 may be configured to receive different operational data. For example, operational data input component A may be configured to receive operational data representative of an activity amount associated with a computing account that indicates a number of times that a computing account interacts with a computing application over a time period and operational data input component B may be configured to receive operational data representative of an activity amount associated with a computing account that indicates whether a computing account has permission to interact with a computing application. Additionally or alternatively, at least some of the plurality of operational data input components 302 may be configured to receive operational data associated with different computing accounts. For example, operational data input component C may be configured to receive operational data associated with a first computing account and operational data input component D may be configured to receive operational data associated with a second computing account.

In some embodiments, the operational data identified by the computing account optimization system 140 may have been generated by the computing account optimization system 140. In this regard, for example, the computing account optimization system 140 may be configured to generate the operational data using an operational data generation model. In some embodiments, the operational data generation model may comprise one or more of a statistical model, an algorithmic model, and/or a machine learning model (e.g., using AI and machine learning circuitry 210 to perform supervised and/or unsupervised machine learning) configured for generating the operational data. For example, the computing account optimization system 140, using the operational data generation model, may be configured to generate operational data representative of an activity amount associated with a computing account by indicating an amount of time that a computing account has interacted with a computing application over a time period.

In some embodiments, the computing account optimization system 140 may be configured to determine that a computing account is associated with a deactivated status based at least in part on the operational data. In some embodiments, the computing account optimization system 140 may determine that a computing account is associated with a deactivated status based at least in part on operational data that indicates that a computing account does not have permission to interact with a computing application. For example, the computing account optimization system 140 may determine that a computing account is associated with a deactivated status based at least in part on operational data that indicates that a computing account does not have permission to interact with the account management computing application 110.

In some embodiments, determining that a computing account is associated with a deactivated status based at least in part on operational data may include the computing account optimization system 140 applying the operational data to an activity amount determination model. In some embodiments, the activity amount determination model may comprise one or more of a statistical model, an algorithmic model, and/or a machine learning model (e.g., using AI and machine learning circuitry 210 to perform supervised and/or unsupervised machine learning) configured for determining if a computing account is associated with a deactivated status.

In some embodiments, by applying the operational data to an activity amount determination model, the computing account optimization system 140 may be configured to determine that the activity amount associated with a computing account is below an activity threshold. In this regard, for example, if the activity amount associated with a computing account is below the activity threshold, the computing account optimization system 140 may be configured to determine that a computing account is associated with a deactivated status.

In some embodiments, by applying the operational data to an activity amount determination model, the computing account optimization system 140 may determine that the activity amount is below the activity threshold if the number of times that a computing account has interacted with a computing application over a time period is below a predetermined amount for the time period. For example, by applying the operational data to an activity amount determination model, the computing account optimization system 140 may determine that the activity amount is below the activity threshold if a computing account has interacted with the account management computing application 110 one time in a time period of the last six months when the predetermined amount for the time period is ten times.

Additionally or alternatively, by applying the operational data to an activity amount determination model, the computing account optimization system 140 may determine that the activity amount is below the activity threshold if the amount of time it has been since a computing account interacted with a computing application is greater than a predetermined amount of time. For example, by applying the operational data to an activity amount determination model, the computing account optimization system 140 may determine that the activity amount is below the activity threshold if a computing account has not interacted with the cloud based computing application 120 in thirty days when the predetermined amount of time is twenty days.

Additionally or alternatively, by applying the operational data to an activity amount determination model, the computing account optimization system 140 may determine that the activity amount is below the activity threshold if the amount of time that a computing account has interacted with a computing application over a time period is less than a predetermined amount of time for the time period. For example, by applying the operational data to an activity amount determination model, the computing account optimization system 140 may determine that the activity amount is below the activity threshold if a computing account has interacted with the sandbox environment computing application 170 for ten minutes in the time period of the last six months when the predetermined amount of time for the time period is ten hours.

Additionally or alternatively, by applying the operational data to an activity determination model, the computing account optimization system 140 may determine that the activity amount is below the activity threshold if the computing account is not adhering to a service level protocol. For example, by applying the operational data to an activity determination model, the computing account optimization system 140 may determine that the activity amount is below the activity threshold if a computing account's interaction with the computing application does not adhere to a service level protocol. As another example, by applying the operational data to an activity determination model, the computing account optimization system 140 may determine that the activity amount is below the activity threshold if the computing application is not performing data intake, data processing, data output, and/or other data process(es) associated with performing one or more computing operations in accordance with a service level protocol.

In some embodiments, the computing account optimization system 140 may be configured to cause a computing account activity interface 400 to be displayed. In some embodiments, the computing account activity interface 400 may include an activity threshold component 402. The activity threshold component 402 may be configured to display an indication that the activity amount associated with a computing account is below the activity threshold. In this regard, the activity threshold component 402 may be configured to indicate whether a computing account is associated with a deactivated status.

In some embodiments, the computing account activity interface 400 may include a deactivated status component 404. In some embodiments, the computing account optimization system 140 may be configured to receive a deactivated indication that indicates a computing account is associated with a deactivated status via the deactivated status component 404. In this regard, for example, the computing account optimization system 140 may be configured to determine that a computing account is associated with a deactivated status based at least in part on a deactivated indication received via the deactivated status component 404. Said differently, for example, the computing account optimization system 140 may be configured to determine that a computing account is associated with a deactivated status based at least in part on one or more of a deactivated indication, operational data that indicates a computing account does not have permission to interact with a computing application, and/or if an activity amount associated with a computing account is below an activity threshold.

In some embodiments, the computing account optimization system 140 may be configured to parse a computing account dataset associated with a computing account to identify a plurality of computing account objects. For example, the computing account optimization system 140 may be configured to parse a computing account dataset associated with a computing account that is associated with a deactivated status. In some embodiments, a computing account dataset may be stored in the one or more databases 150.

In some embodiments, each of the plurality of computing account objects may be data representative of one or more computing tasks associated with a computing account, computing configurations associated with a computing account, computing account associations, and/or computing settings associated with a computing account. For example, the plurality of computing account objects may include one or more computing resource consumption objects. In some embodiments, a computing resource consumption object may be data representative of a computing resource consumption associated with a computing account (e.g., processing power associated with a computing account, memory usage associated with a computing account, seat license allocation associated with a computing account, and/or the like). As another example, the plurality of computing account objects may include one or more notification objects. In some embodiments, a notification object may be data representative of one or more automatic notifications transmitted from and/or transmitted to a computing account. As another example, the plurality of computing account objects may include one or more event objects. In some embodiments, an event object may be data representative of one or more events associated with a computing account (e.g., one or more past, present, or future events that a computing account has a role in).

As another example, the plurality of computing account objects may include one or more computing account group objects. In some embodiments, a computing account group object may be data representative of one or more computing account groups that a computing account is associated with. As another example, the plurality of computing account objects may include one or more action objects action objects. In some embodiments, an action object may be data representative of one or more actions associated with a computing account (e.g., one or more computing tasks that a computing account may act on). As another example, the plurality of computing account objects may include one or more interface configuration objects. In some embodiments, an interface configuration object may be data representative of one or more interface configurations associated with a computing account. As another example, the plurality of computing account objects may include one or more administrator objects. In some embodiments, an administrator object may be data representative of one or more administrator roles performed by a computing account.

As another example, the plurality of computing account objects may include one or more authentication objects. In some embodiments, an authentication object may be data representative of one or more authentication routines associated with a computing account. As another example, the plurality of computing account objects may include one or more security certification objects. In some embodiments, a security certification object may be data representative of one or more security certifications associated with a computing account. As another example, the plurality of computing account objects may include one or more production objects. In some embodiments, a production object may be data representative of a production environment associated with a computing account. As another example, the plurality of computing account objects may include one or more sandbox configuration objects. In some embodiments, a sandbox configuration object may be data representative of a configuration of a sandbox environment associated with a computing account.

As another example, the plurality of computing account objects may include one or more queue objects. In some embodiments, a queue object may be data representative of a task associated with a computing account that is in awaiting action. As another example, the plurality of computing account objects may include one or more document management objects. In some embodiments, a document management object may be data representative of one or more tasks for a computing account to perform in a document management system and/or one or more computing files in a document management system associated with a computing account. As another example, the plurality of computing account objects may include one or more analytics objects. In some embodiments, an analytics object may be data representative an analytics routine associated with a computing account. As another example, the plurality of computing account objects may include one or more coding objects. In some embodiments, a coding object may be data representative of one or more coding operations associated with a computing account.

In some embodiments, the computing account optimization system 140 may be configured to apply the plurality of computing account objects to a computing account objects classification model. In some embodiments, the computing account objects classification model may comprise one or more of a statistical model, an algorithmic model, and/or a machine learning model (e.g., using AI and machine learning circuitry 210 to perform supervised and/or unsupervised machine learning).

In some embodiments, by using the computing account objects classification model, the computing account optimization system 140 may be configured to classify a particular computing account object into a particular classification of a plurality of classifications. In some embodiments, the particular classification of the plurality of classification indicates a particular computing application of a plurality of computing applications associated with the particular computing account object. For example, the particular classification of the plurality of classifications may indicate the account management computing application 110. As another example, the particular classification of the plurality of classifications may indicate the cloud based computing application 120. As another example, the particular classification of the plurality of classifications may indicate the sandbox environment computing application 170. Said differently, by using the computing account objects classification model, the computing account optimization system 140 may be configured to classify each of the plurality of computing account objects into a classification that is associated with the computing application that each of the computing account objects is associated with.

In some embodiments, the computing account optimization system 140 may be configured to generate a plurality of computing account representation requests. In this regard, for example, a particular computing account representation request of the plurality of computing account representation requests may be associated with the particular computing application corresponding to the particular classification of the plurality of classifications. Said differently, the computing account optimization system 140 may be configured to generate a computing account representation request for each of the plurality of computing applications. In this regard, for example, each of the plurality of computing account representation requests may include data representative of at least some of the plurality of computing account objects. For example, the particular computing account representation request may include data representative of at least some of the plurality of computing account objects associated with the account management computing application 110. In this regard, for example, the at least some of the plurality of computing account objects associated with the account management computing application 110 may include one or more notification objects, event objects, computing account group objects, action objects, interface configuration objects, administrator objects, authentication objects, and/or security certification objects. As another example, the particular computing account representation request may include data representative of at least some of the plurality of computing account objects associated with the cloud based computing application 120. In this regard, for example, the at least some of the plurality of computing account objects associated with the cloud based computing application 120 may include one or more computing resource consumption objects, document management objects, and/or analytics objects. As another example, the particular computing account representation request may include data representative of at least some of the plurality of computing account objects associated with the sandbox environment computing application 170. In this regard, for example, the at least some of the plurality of computing account objects associated with the sandbox environment computing application 170 may include one or more production objects, sandbox objects, coding objects, and/or queue objects.

In some embodiments, each of the plurality of computing account representation requests may include one or more deactivation triggers and/or one or more activation triggers. In some embodiments, at least one of the one or more deactivation triggers may cause a computing account to be disassociated with at least one of the plurality of computing account objects. For example, if a computing account is associated with a computing account group object associated with the account management computing application 110, a deactivation trigger may cause a computing account to be disassociated with a computing account group object associated with the account management computing application 110 (e.g., a computing account may no longer be associated with a computing account group that a computing account group object is representative of).

In some embodiments, at least one of the one or more activation triggers may cause one or more other computing accounts to be associated with at least one of the plurality of computing account objects. For example, an activation trigger may cause an interface configuration object associated with the account management computing application 110 to be newly associated with one or more other computing accounts (e.g., one or more other computing accounts that were not previously associated with the interface configuration object). In this regard, for example, in some embodiments, a computing account representation request may include an activation trigger that disassociates a computing account object from a computing account and associate the computing account object (e.g., reassign) with another computing account.

In some embodiments, at least one of the one or more activation triggers may cause a plurality of other computing accounts to be associated with at least one of the plurality of computing account objects. For example, an activation trigger may cause a document management object associated with the cloud based computing application 120 to be newly associated with a plurality of other computing accounts (e.g., a plurality of other computing accounts that were not previously associated with the document management object). In this regard, for example, in some embodiments, a computing account representation request may include an activation trigger configured to disassociate a computing account object from a computing account and associated the computing account object (e.g., reassign) with at least two other computing accounts.

In some embodiments, at least one of the one or more activation triggers may cause a first metadata associated with at least one of the plurality of computing account objects to be replaced with second metadata. For example, a document management object associated with the cloud based computing application 120 may be associated with first metadata representing information about a computing account associated with one or more computing files associated with the document management object. In this regard, for example, the at least one of the one or more activation triggers may cause the first metadata associated with the at least one of the plurality of computing account objects to be associated with second metadata. In some embodiments, for example, the second metadata may represent information about another computing account (e.g., the first metadata represents information about a first computing account and the second metadata represents information about a second computing account).

In some embodiments, at least one of the one or more deactivation triggers may reduce a computing resource consumption associated with a computing account. In some embodiments, a deactivation trigger may reduce a computing resource consumption by disassociating a computing account with a computing resource consumption object. In this regard, for example, a deactivation trigger may disassociate with a processing power (e.g., processing power previously used by a computing account), a memory usage (e.g., memory usage previously associated with a computing account), and/or a seat license allocation (e.g., a seat license allocation previously associated with a computing account).

In some embodiments, at least one of the one or more deactivation triggers may revoke a security certificate associated with a computing account. In some embodiments, a deactivation trigger may revoke a security certificate associated with a computing account by disassociating a computing account with a security certification object. For example, by disassociating a computing account with a security certificate object, a deactivation trigger may revoke a computing account's ability to access the sandbox environment computing application 170. In some embodiments, at least one of the one or more activation triggers may provide a security certificate to a computing account. In some embodiments, an activation trigger may provide a security certificate to a computing account by associating a computing account with a security certificate. For example, by associating a computing account with a security certificate object, an activation trigger may provide a computing account with the ability to access the sandbox environment computing application 170.

In some embodiments, the computing account optimization system 140 may be configured to transmit each of the plurality of computing account representation requests to a corresponding computing application of the plurality of computing applications. In this regard, for example, the computing account optimization system 140 may be configured to transmit a particular computing account representation request to a particular computing account application corresponding to the particular computing account representation. For example, the computing account optimization system 140 may be configured to transmit a computing account representation request associated with the account management computing application 110 to the account management computing application 110, a computing account representation request associated with the cloud based computing application 120 to the cloud based computing application 120, and/or a computing account representation request associated with the sandbox environment computing application 170 to the sandbox environment computing application 170.

Example Methods

Figure 5:
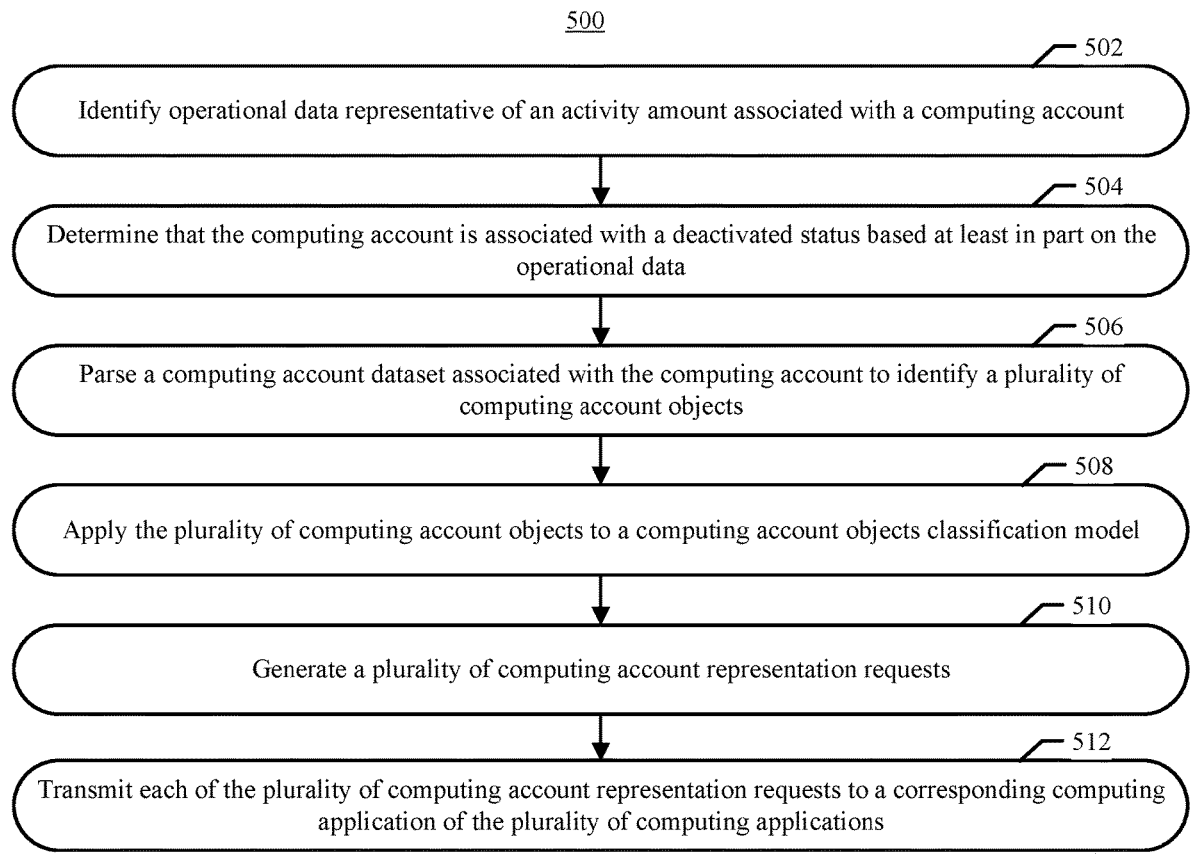
FIG. 5 illustrates a flow chart of an example computer-implemented method in accordance with one or more embodiments of the present disclosure.

Referring now to FIG. 5, a flowchart providing an example computer-implemented method 500 is illustrated. In this regard, FIG. 5 illustrates operations that may be performed by the computing account optimization system 140.

As shown in block 502, the computer-implemented method 500 may include identifying operational data representative of an activity amount associated with a computing account. As described above, in some embodiments, a computing account may be configured to interact with one or more computing applications. Said differently a computing account may be configured to cause a computing application to perform data intake, data processing, data output, and/or other data process(es) associated with performing one or more computing operations. For example, a computing account may be configured to cause the account management computing application, the cloud based computing application, and/or the sandbox environment computing application to perform data intake, data processing, data output, and/or other data process(es) associated with performing one or more computing operations.

In some embodiments, the operational data may be representative of an activity amount associated with a computing account by indicating a number of times that a computing account interacts with a computing application over a time period. Said differently, the operational data may indicate the number of times a computing account causes a computing application to perform data intake, data processing, data output, and/or other data process(es) associated with performing one or more computing operations in a time period. For example, the operational data may indicate that a computing account has interacted with the account management computing application ten times in the last seven day period.

In some embodiments, the operational data may be representative of an activity amount associated with a computing account by indicating an amount of time it has been since a computing account interacted with a computing application. Said differently, the operational data may indicate the amount of time it has been since a computing account caused a computing application to perform data intake, data processing, data output, and/or other data process(es) associated with performing one or more computing operations. For example, the operational data may indicate that it has been sixty days since a computing account has interacted with the cloud based computing application.

In some embodiments, the operational data may be representative of an activity amount associated with a computing account by indicating an amount of time that a computing account has interacted with a computing application over a time period. Said differently, the operational data may indicate the amount of time that a computing account has caused a computing application to perform data intake, data processing, data output, and/or other data process(es) associated with performing one or more computing operations over time period. For example, the operational data may indicate that a computing account has interacted with the sandbox environment computing application for ten hours over the last seven day period.

In some embodiments, the operational data may be representative of an activity amount associated with a computing account by indicating whether a computing account is adhering to a service level protocol. Said differently, the operational data may indicate whether a computing account is causing a computing application to perform data intake, data processing, data output, and/or other data process(es) associated with performing one or more computing operations in accordance with a service level protocol. For example, the operational data may indicate that a computing account is not adhering to a service level protocol.

In some embodiments, the operational data may be representative of an activity amount associated with a computing account by indicating whether a computing account has permission to interact with a computing application. Said differently, the operational data may indicate whether a computing account has permission to cause a computing application to perform data intake, data processing, data output, and/or other data process(es) associated with performing one or more computing operations. For example, the operational data may indicate that a computing account does not have permission to interact with the account management computing application.

In some embodiments, the operational data identified may be received via an operational data input interface. In this regard, the operational data input interface may include a plurality of operational data input components. In some embodiments, at least some of the plurality operational data input components may be configured to receive different operational data. For example, operational data input component A may be configured to receive operational data representative of an activity amount associated with a computing account that indicates a number of times that a computing account interacts with a computing application over a time period and operational data input component B may be configured to receive operational data representative of an activity amount associated with a computing account that indicates whether a computing account has permission to interact with a computing application. Additionally or alternatively, at least some of the plurality of operational data input components may be configured to receive operational data associated with different computing accounts. For example, operational data input component C may be configured to receive operational data associated with a first computing account and operational data input component D may be configured to receive operational data associated with a second computing account.

In some embodiments, the operational data identified may have been generated. In this regard, for example, the operational data may be generated using an operational data generation model. In some embodiments, the operational data generation model may comprise one or more of a statistical model, an algorithmic model, and/or a machine learning model (e.g., using AI and machine learning circuitry to perform supervised and/or unsupervised machine learning) configured for generating the operational data. For example, using the operational data generation model, operational data representative of an activity amount associated with a computing account may be generated by indicating an amount of time that a computing account has interacted with a computing application over a time period.

As shown in block 504, the computer-implemented method 500 may include determining that the computing account is associated with a deactivated status based at least in part on the operational data. As described above, in some embodiments, it may be determined that a computing account is associated with a deactivated status based at least on part on operational data that indicates that a computing account does not have permission to interact with a computing application. For example, it may be determined that a computing account is associated with a deactivated status based at least in part on operational data that indicates that a computing account does not have permission to interact with the account management computing application.

In some embodiments, determining that a computing account is associated with a deactivated status based at least in part on operational data may include applying the operational data to an activity amount determination model. In some embodiments, the activity amount determination model may comprise one or more of a statistical model, an algorithmic model, and/or a machine learning model (e.g., using AI and machine learning circuitry to perform supervised and/or unsupervised machine learning) configured for determining if a computing account is associated with a deactivated status.

In some embodiments, by applying the operational data to an activity amount determination model, it may be determined that the activity amount associated with a computing account is below an activity threshold. In this regard, for example, if the activity amount associated with a computing account is below the activity threshold, it may be determined that a computing account is associated with a deactivated status.

In some embodiments, by applying the operational data to an activity amount determination model, it may be determined that the activity amount is below the activity threshold if the number of times that a computing account has interacted with a computing application over a time period is below a predetermined amount for the time period. For example, by applying the operational data to an activity amount determination model, it may be determined that the activity amount is below the activity threshold if a computing account has interacted with the account management computing application one time in a time period of the last six months when the predetermined amount for the time period is ten times.

Additionally or alternatively, by applying the operational data to an activity amount determination model, it may be determined that the activity amount is below the activity threshold if the amount of time it has been since a computing account interacted with a computing application is greater than a predetermined amount of time. For example, by applying the operational data to an activity amount determination model, it may be determined that the activity amount is below the activity threshold if a computing account has not interacted with the cloud based computing application in thirty days when the predetermined amount of time is twenty days.

Additionally or alternatively, by applying the operational data to an activity amount determination model, it may be determined that the activity amount is below the activity threshold if the amount of time that a computing account has interacted with a computing application over a time period is less than a predetermined amount of time for the time period. For example, by applying the operational data to an activity amount determination model, it may be determined that the activity amount is below the activity threshold if a computing account has interacted with the sandbox environment computing application for ten minutes in the time period of the last six months when the predetermined amount of time for the time period is ten hours.

Additionally or alternatively, by applying the operational data to an activity determination model, it may be determined that the activity amount is below the activity threshold if the computing account is not adhering to a service level protocol. For example, by applying the operational data to an activity determination model, it may be determined that the activity amount is below the activity threshold if a computing account's interaction with the computing application does not adhere to a service level protocol. As another example, by applying the operational data to an activity determination model, it may be determined that the activity amount is below the activity threshold if the computing application is not performing data intake, data processing, data output, and/or other data process(es) associated with performing one or more computing operations in accordance with a service level protocol.

In some embodiments, a computing account activity interface may be caused to be displayed. In some embodiments, the computing account activity interface may include an activity threshold component. The activity threshold component may be configured to display an indication that the activity amount associated with a computing account is below the activity threshold. In this regard, the activity threshold component may be configured to indicate whether a computing account is associated with a deactivated status.

In some embodiments, the computing account activity interface may include a deactivated status component. In some embodiments, the computing account optimization system may be configured to receive a deactivated indication that indicates a computing account is associated with a deactivated status via the deactivated status component. In this regard, for example, the computing account optimization system may be configured to determine that a computing account is associated with a deactivated status based at least in part on a deactivated indication received via the deactivated status component. Said differently, for example, the computing account optimization system may be configured to determine that a computing account is associated with a deactivated status based at least in part on one or more of a deactivated indication, operational data that indicates a computing account does not have permission to interact with a computing application, and/or if an activity amount associated with a computing account is below an activity threshold.

As shown in block 506, the computer-implemented method 500 may include parsing a computing account dataset associated with the computing account to identify a plurality of computing account objects. As described above, for example, a computing account dataset associated with a computing account that is associated with a deactivated status may be parsed.

In some embodiments, each of the plurality of computing account objects may be data representative of one or more computing tasks associated with a computing account, computing configurations associated with a computing account, computing account associations, and/or computing settings associated with a computing account. For example, the plurality of computing account objects may include one or more computing resource consumption objects. In some embodiments, a computing resource consumption object may be data representative of a computing resource consumption associated with a computing account (e.g., processing power associated with a computing account, memory usage associated with a computing account, seat license allocation associated with a computing account, and/or the like). As another example, the plurality of computing account objects may include one or more notification objects. In some embodiments, a notification object may be data representative of one or more automatic notifications transmitted from and/or transmitted to a computing account. As another example, the plurality of computing account objects may include one or more event objects. In some embodiments, an event object may be data representative of one or more events associated with a computing account (e.g., one or more past, present, or future events that a computing account has a role in).

As another example, the plurality of computing account objects may include one or more computing account group objects. In some embodiments, a computing account group object may be data representative of one or more computing account groups that a computing account is associated with. As another example, the plurality of computing account objects may include one or more action objects action objects. In some embodiments, an action object may be data representative of one or more actions associated with a computing account (e.g., one or more computing tasks that a computing account may act on). As another example, the plurality of computing account objects may include one or more interface configuration objects. In some embodiments, an interface configuration object may be data representative of one or more interface configurations associated with a computing account. As another example, the plurality of computing account objects may include one or more administrator objects. In some embodiments, an administrator object may be data representative of one or more administrator roles performed by a computing account.

As another example, the plurality of computing account objects may include one or more authentication objects. In some embodiments, an authentication object may be data representative of one or more authentication routines associated with a computing account. As another example, the plurality of computing account objects may include one or more security certification objects. In some embodiments, a security certification object may be data representative of one or more security certifications associated with a computing account. As another example, the plurality of computing account objects may include one or more production objects. In some embodiments, a production object may be data representative of a production environment associated with a computing account. As another example, the plurality of computing account objects may include one or more sandbox configuration objects. In some embodiments, a sandbox configuration object may be data representative of a configuration of a sandbox environment associated with a computing account.

As another example, the plurality of computing account objects may include one or more queue objects. In some embodiments, a queue object may be data representative of a task associated with a computing account that is in awaiting action. As another example, the plurality of computing account objects may include one or more document management objects. In some embodiments, a document management object may be data representative of one or more tasks for a computing account to perform in a document management system and/or one or more computing files in a document management system associated with a computing account. As another example, the plurality of computing account objects may include one or more analytics objects. In some embodiments, an analytics object may be data representative an analytics routine associated with a computing account. As another example, the plurality of computing account objects may include one or more coding objects. In some embodiments, a coding object may be data representative of one or more coding operations associated with a computing account.

As shown in block 508, the computer-implemented method 500 may include applying the plurality of computing account objects to a computing account objects classification model. As described above, in some embodiments, the computing account objects classification model may comprise one or more of a statistical model, an algorithmic model, and/or a machine learning model (e.g., using AI and machine learning circuitry to perform supervised and/or unsupervised machine learning).

In some embodiments, by using the computing account objects classification model, a particular computing account object may be classified into a particular classification of a plurality of classifications. In some embodiments, the particular classification of the plurality of classification indicates a particular computing application of a plurality of computing applications associated with the particular computing account object. For example, the particular classification of the plurality of classifications may indicate the account management computing application. As another example, the particular classification of the plurality of classifications may indicate the cloud based computing application. As another example, the particular classification of the plurality of classifications may indicate the sandbox environment computing application. Said differently, by using the computing account objects classification model, each of the plurality of computing account objects may be classified into a classification that is associated with the computing application that each of the computing account objects is associated with.

As shown in block 510, the computer-implemented method 500 may include generating a plurality of computing account representation requests. As described above, in this regard, for example, a particular computing account representation request of the plurality of computing account representation requests may be associated with the particular computing application corresponding to the particular classification of the plurality of classifications. Said differently, a computing account representation request may be generated for each of the plurality of computing applications. In this regard, for example, each of the plurality of computing account representation requests may include data representative of at least some of the plurality of computing account objects. For example, the particular computing account representation request may include data representative of at least some of the plurality of computing account objects associated with the account management computing application. In this regard, for example, the at least some of the plurality of computing account objects associated with the account management computing application may include one or more notification objects, event objects, computing account group objects, action objects, interface configuration objects, administrator objects, authentication objects, and/or security certification objects. As another example, the particular computing account representation request may include data representative of at least some of the plurality of computing account objects associated with the cloud based computing application. In this regard, for example, the at least some of the plurality of computing account objects associated with the cloud based computing application may include one or more computing resource consumption objects, document management objects, and/or analytics objects. As another example, the particular computing account representation request may include data representative of at least some of the plurality of computing account objects associated with the sandbox environment computing application. In this regard, for example, the at least some of the plurality of computing account objects associated with the sandbox environment computing application may include one or more production objects, sandbox objects, coding objects, and/or queue objects.

In some embodiments, each of the plurality of computing account representation requests may include one or more deactivation triggers and/or one or more activation triggers. In some embodiments, at least one of the one or more deactivation triggers may cause a computing account to be disassociated with at least one of the plurality of computing account objects. For example, if a computing account is associated with a computing account group object associated with the account management computing application, a deactivation trigger may cause a computing account to be disassociated with a computing account group object associated with the account management computing application (e.g., a computing account may no longer be associated with a computing account group that a computing account group object is representative of).

In some embodiments, at least one of the one or more activation triggers may cause one or more other computing accounts to be associated with at least one of the plurality of computing account objects. For example, an activation trigger may cause an interface configuration object associated with the account management computing application to be newly associated with one or more other computing accounts (e.g., one or more other computing accounts that were not previously associated with the interface configuration object). In this regard, for example, in some embodiments, a computing account representation request may include an activation trigger that disassociates a computing account object from a computing account and associate the computing account object (e.g., reassign) with another computing account.

In some embodiments, at least one of the one or more activation triggers may cause a plurality of other computing accounts to be associated with at least one of the plurality of computing account objects. For example, an activation trigger may cause a document management object associated with the cloud based computing application to be newly associated with a plurality of other computing accounts (e.g., a plurality of other computing accounts that were not previously associated with the document management object). In this regard, for example, in some embodiments, a computing account representation request may include an activation trigger configured to disassociate a computing account object from a computing account and associated the computing account object (e.g., reassign) with at least two other computing accounts.

In some embodiments, at least one of the one or more activation triggers may cause a first metadata associated with at least one of the plurality of computing account objects to be replaced with second metadata. For example, a document management object associated with the cloud based computing application may be associated with first metadata representing information about a computing account associated with one or more computing files associated with the document management object. In this regard, for example, the at least one of the one or more activation triggers may cause the first metadata associated with the at least one of the plurality of computing account objects to be associated with second metadata. In some embodiments, for example, the second metadata may represent information about another computing account (e.g., the first metadata represents information about a first computing account and the second metadata represents information about a second computing account).

In some embodiments, at least one of the one or more deactivation triggers may reduce a computing resource consumption associated with a computing account. In some embodiments, a deactivation trigger may reduce a computing resource consumption by disassociating a computing account with a computing resource consumption object. In this regard, for example, a deactivation trigger may disassociate with a processing power (e.g., processing power previously used by a computing account), a memory usage (e.g., memory usage previously associated with a computing account), and/or a seat license allocation (e.g., a seat license allocation previously associated with a computing account).

In some embodiments, at least one of the one or more deactivation triggers may revoke a security certificate associated with a computing account. In some embodiments, a deactivation trigger may revoke a security certificate associated with a computing account by disassociating a computing account with a security certification object. For example, by disassociating a computing account with a security certificate object, a deactivation trigger may revoke a computing account's ability to access the sandbox environment computing application. In some embodiments, at least one of the one or more activation triggers may provide a security certificate to a computing account. In some embodiments, an activation trigger may provide a security certificate to a computing account by associating a computing account with a security certificate. For example, by associating a computing account with a security certificate object, an activation trigger may provide a computing account with the ability to access the sandbox environment computing application.

As shown in block 512, the computer-implemented method 500 may include transmitting each of the plurality of computing account representation requests to a corresponding computing application of the plurality of computing applications. As described above, in this regard, for example, a particular computing account representation request may be transmitted to a particular computing account application corresponding to the particular computing account representation. For example, a computing account representation request associated with the account management computing application may be transmitted to the account management computing application, a computing account representation request associated with the cloud based computing application to the cloud based computing application, and/or a computing account representation request associated with the sandbox environment computing application to the sandbox environment computing application.

That which is claimed:

1. A computer-implemented method comprising:
    identifying operational data representative of an activity amount associated with a computing account;
    determining that the computing account is associated with a deactivated status based at least in part on the operational data;
    parsing a computing account dataset associated with the computing account to identify a plurality of computing account objects;
    applying the plurality of computing account objects to a computing account objects classification model, wherein the computing account objects classification model is configured to classify a particular computing account object into a particular classification of a plurality of classifications, wherein the particular classification of the plurality of classifications indicates a particular computing application of a plurality of computing applications associated with the particular computing account object;
    generating a plurality of computing account representation requests, wherein a particular computing account representation request of the plurality of computing account representation requests is associated with the particular computing application corresponding to the particular classification of the plurality of classifications; and
    transmitting each of the plurality of computing account representation requests to a corresponding computing application of the plurality of computing applications, wherein the particular computing account representation request is transmitted to the particular computing application corresponding to the particular computing account representation request.

2. The computer-implemented method of claim 1, wherein the plurality of computing applications includes one or more of an account management computing application, a cloud based computing application, or a sandbox environment computing application.

3. The computer-implemented method of claim 2, wherein each of the plurality of computing account representation requests include one or more deactivation triggers or one or more activation triggers.

4. The computer-implemented method of claim 3, wherein at least one of the one or more deactivation triggers causes the computing account to be disassociated with at least one of the plurality of computing account objects.

5. The computer-implemented method of claim 3, wherein at least one of the one or more activation triggers causes one or more other computing accounts to be associated with at least one of the plurality of computing account objects.

6. The computer-implemented method of claim 3, wherein at least one of the one or more activation triggers causes a plurality of other computing accounts to be associated with at least one of the plurality of computing account objects.

7. The computer-implemented method of claim 3, wherein at least one of the one or more activation triggers causes first metadata associated with at least one of the plurality of computing account objects to be replaced with second metadata.

8. The computer-implemented method of claim 3, wherein at least one of the one or more deactivation triggers reduces a computing resource consumption associated with the computing account.

9. The computer-implemented method of claim 3, wherein at least one of the of the one or more deactivation triggers is revokes a security certificate associated with the computing account and at least one of the one or more activation triggers provides the security certification to one or more other computing accounts.

10. The computer-implemented method of claim 1, wherein determining that the computing account is associated with a deactivated status based at least in part on the operational data comprises:
applying the operational data to an activity amount determination model to determine that the activity amount associated with a computing account is below an activity threshold.

11. An apparatus comprising at least one processor and at least one memory coupled to the at least one processor, wherein the at least one processor is configured to:
identify operational data representative of an activity amount associated with a computing account;
determine that the computing account is associated with a deactivated status based at least in part on the operational data;
parse a computing account dataset associated with the computing account to identify a plurality of computing account objects;
apply the plurality of computing account objects to a computing account objects classification model, wherein the computing account objects classification model is configured to classify a particular computing account object into a particular classification of a plurality of classifications, wherein the particular classification of the plurality of classifications indicates a particular computing application of a plurality of computing applications associated with the particular computing account object;
generate a plurality of computing account representation requests, wherein a particular computing account representation request of the plurality of computing account representation requests is associated with the particular computing application corresponding to the particular classification of the plurality of classifications; and
transmit each of the plurality of computing account representation requests to a corresponding computing application of the plurality of computing applications, wherein the particular computing account representation request is transmitted to the particular computing application corresponding to the particular computing account representation request.

12. The apparatus of claim 11, wherein the plurality of computing applications includes one or more of an account management computing application, a cloud based computing application, or a sandbox environment computing application.

13. The apparatus of claim 12, wherein each of the plurality of computing account representation requests include one or more deactivation triggers or one or more activation triggers.

14. The apparatus of claim 13, wherein at least one of the one or more deactivation triggers causes the computing account to be disassociated with at least one of the plurality of computing account objects.

15. The apparatus of claim 13, wherein at least one of the one or more activation triggers causes one or more other computing accounts to be associated with at least one of the plurality of computing account objects.

16. The apparatus of claim 13, wherein at least one of the one or more activation triggers causes first metadata associated with at least one of the plurality of computing account objects to be replaced with second metadata.

17. The apparatus of claim 13, wherein at least one of the one or more deactivation triggers reduces a computing resource consumption associated with the computing account.

18. The apparatus of claim 13, wherein at least one of the of the one or more deactivation triggers is revokes a security certificate associated with the computing account and at least one of the one or more activation triggers provides the security certification to one or more other computing accounts.

19. The apparatus of claim 11, wherein determining that the computing account is associated with a deactivated status based at least in part on the operational data comprises the apparatus being configured to:
applying the operational data to an activity amount determination model to determine that the activity amount associated with a computing account is below an activity threshold.

20. A non-transitory computer-readable storage medium comprising computer program code for execution by one or more processors of a device, the computer program code configured to, when executed by the one or more processors, cause the device to:
identify operational data representative of an activity amount associated with a computing account;
determine that the computing account is associated with a deactivated status based at least in part on the operational data;
parse a computing account dataset associated with the computing account to identify a plurality of computing account objects;

apply the plurality of computing account objects to a computing account objects classification model, wherein the computing account objects classification model is configured to classify a particular computing account object into a particular classification of a plurality of classifications, wherein the particular classification of the plurality of classifications indicates a particular computing application of a plurality of computing applications associated with the particular computing account object;

generate a plurality of computing account representation requests, wherein a particular computing account representation request of the plurality of computing account representation requests is associated with the particular computing application corresponding to the particular classification of the plurality of classifications; and transmit each of the plurality of computing account representation requests to a corresponding computing application of the plurality of computing applications, wherein the particular computing account representation request is transmitted to the particular computing application corresponding to the particular computing account representation request.

* * * * *